(12) United States Patent
Kimhi

(10) Patent No.: US 11,892,747 B2
(45) Date of Patent: Feb. 6, 2024

(54) LENS CAP AND METHOD FOR AUTOMATIC RECOGNITION OF THE SAME

(71) Applicant: DSP GROUP LTD., Herzelia (IL)

(72) Inventor: Tomer Kimhi, Tel Aviv (IL)

(73) Assignee: DSP GROUP LTD.

(*) Notice: Subject to any disclaimer, the term of this patent is extended or adjusted under 35 U.S.C. 154(b) by 0 days.

(21) Appl. No.: 17/878,979

(22) Filed: Aug. 2, 2022

(65) Prior Publication Data
US 2023/0045619 A1     Feb. 9, 2023

(30) Foreign Application Priority Data
Aug. 3, 2021 (IL) .......................................... 285338

(51) Int. Cl.
| | |
|---|---|
| *G03B 11/04* | (2021.01) |
| *G06V 10/75* | (2022.01) |
| *H04N 23/61* | (2023.01) |
| *H04N 23/52* | (2023.01) |

(52) U.S. Cl.
CPC .......... *G03B 11/041* (2013.01); *G06V 10/751* (2022.01); *H04N 23/52* (2023.01); *H04N 23/61* (2023.01)

(58) Field of Classification Search
CPC .......... H04N 5/22521; H04N 5/23218; H04N 7/18; G03B 11/041; G03B 17/561
USPC ......................................................... 396/448
See application file for complete search history.

(56) References Cited

U.S. PATENT DOCUMENTS

| | | | |
|---|---|---|---|
| 5,499,069 A | 3/1996 | Griffith | |
| 6,714,724 B1 | 3/2004 | Cook | |
| 7,871,209 B1* | 6/2011 | Sampathkumaran | .. G03B 11/04 |
| 2002/0008778 A1 | 1/2002 | Grigorian | |
| 2002/0171756 A1 | 11/2002 | Bigler | |
| 2004/0196442 A1 | 10/2004 | D'Alessio et al. | |
| 2009/0066790 A1 | 3/2009 | Hammadou | |
| 2009/0153692 A1 | 6/2009 | Koide | |
| 2012/0099832 A1 | 4/2012 | Gupta et al. | |
| 2014/0160261 A1* | 6/2014 | Miller | ................ A61B 1/00105 348/77 |
| 2016/0065908 A1 | 3/2016 | Chang et al. | |
| 2016/0275641 A1 | 9/2016 | Bostick et al. | |
| 2018/0115689 A1* | 4/2018 | Lin | .......... G02B 7/09 |
| 2018/0234643 A1 | 8/2018 | Kobayashi | |
| 2018/0336669 A1 | 11/2018 | Mertens | |
| 2019/0139502 A1 | 5/2019 | Onozawa et al. | |
| 2019/0222756 A1 | 7/2019 | Moloney et al. | |
| 2021/0132467 A1 | 5/2021 | Okunami et al. | |
| 2022/0252960 A1* | 8/2022 | Devine | .................... G03B 9/06 |

FOREIGN PATENT DOCUMENTS

JP     2008022460 A     1/2008

OTHER PUBLICATIONS

U.S. Appl. No. 16/706,875, Substitute Specification filed Jan. 29, 2020 with Application and Drawings filed Dec. 9, 2019, pp. 1-35.

* cited by examiner

*Primary Examiner* — Xi Wang
(74) *Attorney, Agent, or Firm* — Paradice & Li LLP

(57) ABSTRACT

A visual sensor having a light sensitive element and a processor, the processor being adapted to recognize whether a cap is on or off the light sensitive element by recognizing a unique identification pattern coded into the light sensitive element.

16 Claims, 4 Drawing Sheets

LENS CAP AND METHOD FOR AUTOMATIC RECOGNITION OF THE SAME

CROSS-REFERENCE TO RELATED APPLICATION

This application claims priority to Israel Patent Application No. 285338, filed on Aug. 3, 2021, now Patent No. 285338, which is incorporated herein by reference in its entirety.

TECHNICAL FIELD

The present disclosure relates to visual sensors in general, and to a lens cap and a method for the visual sensor to recognize whether the lens cap is on, in particular.

BACKGROUND

A lens cover or lens cap is a physical object designed to provide protection for a lens. When the cap is attached to a light-sensitive sensor (such as a CCD sensor, a CMOS sensor or others) it protects the sensor from excess light as well as from mechanical or radiation damage. This is relevant for a camera, a video camera or camcorder, or any other visual sensor or another device having a lens and an image sensor.

The cap may protect from mechanical problems, such as dust and minor collisions and scratches, provide optical protection of the sensing element from illumination damage, and may ensure privacy.

Lens covers come standard with most cameras and lenses, and also with some mobile phones having a camera, with action cameras, with surveillance sensors and the like. The lens cover may be a part of the camera itself, or may formed as an attachment to the camera. Either way, when the camera is capped, the cover blocks the light from impinging on the sensor.

A common problem with a lens cap is that it is sometime very easy to lose, including at locations in which it is difficult to get a replacement. Despite its low price, the loss may expose the lens and camera to significant damage, which may incur high fixing costs.

Another common problem with a lens cap is that the device user does not always notice that the device is capped, until or sometimes after using the device. For example, when using a camera, if the photographer intended to take a photo at a unique moment, capturing for example a child's smile, a specific pose, a special moment in nature, or the like, when the photographer realizes that the cap is on, the special moment may already be gone.

Yet another problem may be that in some applications the camera, or a sensing unit needs to know whether the lens is capped, for example for purposes such as energy saving or better interaction with the user.

SUMMARY

One exemplary embodiment of the disclosed subject matter is a visual sensor comprising: a light sensitive element; and a processor, the processor being adapted to recognize whether a cap is on or off the light sensitive element. Within the visual sensor, recognizing that the cap is on optionally comprises recognizing a unique identification pattern, coded into the light sensitive element. Within the visual sensor, it is optionally determined that a wrong cap is on subject to the identification pattern being than the unique identification pattern.

Another exemplary embodiment of the disclosed subject matter is a cap for protecting an image sensor of a visual sensor, the cap comprising a light-transmitting part. The light-transmitting part is optionally an opening in the cap. An area of the opening is optionally less than 20% of an area of the cap. Within the cap, the light-transmitting part optionally has an area smaller than an area of the cap. Within the cap, the light-transmitting part optionally has an area smaller than half an area of the cap. Within the cap, the light transmitting part optionally comprises two or more distinct areas having different transparency values. A visual sensor may be adapted to be capped with the cap, the visual sensor optionally comprising: a light sensitive element for outputting a pixel map; and a processor for: determining whether the pixel map is in accordance with a predetermined pattern; subject to the pixel map corresponding to the predetermined pattern, determining that the visual sensor is capped by the cap, and subject to the pixel map not corresponding to the predetermined pattern, determining that the visual sensor is not capped by the cap; and taking an action, dependent on whether the visual sensor is capped or not capped, in accordance with a setting. Within the visual sensor, determining whether the pixel map is in accordance with a predetermined pattern optionally comprises: obtaining a first characteristic of a preliminary pixel map; obtaining a second characteristic of the pixel map output by the light sensitive element; and comparing the first characteristic to the second characteristic. Within the visual sensor, the action optionally comprises issuing an alert to a user of the visual sensor. Within the cap, the light-transmitting part optionally comprises a section transparent only to a specific wavelength range. A visual sensor may be adapted to be capped with the cap, the visual sensor may comprise: a light sensitive element comprising pixels sensitive only to the specific wavelength range and pixels sensitive to a different wavelength range, the light sensitive element outputting a first pixel map from the pixels sensitive only to the specific wavelength range and a second pixel map from the pixels sensitive to the different wavelength range; and a processor for: subject to the first pixel map corresponding to the second pixel map determining that the visual sensor is not capped by the cap, and subject to the pixel map corresponding to the predetermined pattern, determining that the visual sensor is capped by the cap; and taking an action, dependent on whether the visual sensor is capped or not capped, in accordance with a setting.

Yet another exemplary embodiment of the disclosed subject matter is a cap for protecting an image sensor of a visual sensor, the cap comprising a radiating element located on a side of the cap facing a lens of the visual sensor when the sensing unit is capped. Within the cap, the radiating element is optionally an optical radiant element. Within the cap, the radiating element is optionally a Light Emitting Diode (LED) or a phosphorescent material. Within the cap, the radiating element is optionally an infrared radiant element. The cap can further comprise a power source for providing power to the radiating element. The cap can further comprise wiring for providing power to the radiating element from the visual sensor when the cap is on. A visual sensor may be adapted to be capped with the cap, the visual sensor optionally comprising: a light sensitive element for outputting a pixel map; a processor for: determining whether the pixel map is in accordance with a predetermined pattern; subject to the pixel map corresponding to the predetermined pattern, determining that the visual sensor is capped by the cap, and subject to the pixel map not corresponding to the predetermined pattern, determining that the visual sensor is not capped by the cap; and taking an action, dependent on whether the cap is on or off, in accordance with a setting. Within the visual sensor, determining whether the pixel map is in accordance with a predetermined pattern optionally comprises: obtaining a first characteristic of a preliminary pixel map; obtaining a second characteristic of the pixel map output by the light sensitive element; and comparing the first characteristic to the second characteristic. Within the visual sensor, the action optionally comprises issuing an alert to a user of the visual sensor. Within the cap, the radiating element optionally radiates in a predetermined wavelength range. A visual sensor may be adapted to be capped with the cap, the visual sensor may comprise: a light sensitive element comprising pixels sensitive only to the specific wavelength range and pixels sensitive to a different wavelength range, the light sensitive element outputting a first pixel map from the pixels sensitive only to the specific wavelength range and a second pixel map from the pixels sensitive to the different wavelength range; and a processor for: subject to the first pixel map corresponding to the second pixel map determining that the visual sensor is not capped by the cap, and subject to the pixel map corresponding to the predetermined pattern, determining that the visual sensor is capped by the cap; and taking an action, dependent on whether the visual sensor is capped or not capped, in accordance with a setting.

Yet another exemplary embodiment of the disclosed subject matter is a cap for protecting an image sensor of a visual sensor, the cap comprising a reflector located on a side of the cap facing a lens of the visual sensor when the cap is on. A visual sensor may be adapted to be capped with the cap, the visual sensor optionally comprising: a light sensitive element for outputting a pixel map; a radiating element; and a processor for: determining whether the pixel map is in accordance with a predetermined pattern; subject to the pixel map corresponding to the predetermined pattern, determining that the visual sensor is capped by the cap, and subject to the pixel map not corresponding to the predetermined pattern, determining that the visual sensor is not capped by the cap; and taking an action, dependent on whether the visual sensor is capped or not capped, in accordance with a setting. Within the visual sensor, the radiating element optionally radiates in the predetermined wavelength range, and the visual sensor may comprise: a light sensitive element comprising pixels sensitive only to the specific wavelength range and pixels sensitive to a different wavelength range, the light sensitive element outputting a first pixel map from the pixels sensitive only to the specific wavelength range and a second pixel map from the pixels sensitive to the different wavelength range; and a processor for: subject to the pixel map corresponding to the predetermined pattern, determining that the visual sensor is capped by the cap, and subject to the pixel map not corresponding to the predetermined pattern, determining that the visual sensor is not capped by the cap; and taking an action, dependent on whether the visual sensor is capped or not capped, in accordance with a setting.

Yet another exemplary embodiment of the disclosed subject matter is a method for operating a visual sensor comprising a light sensitive element, the method comprising: determining whether a pixel map output by the light sensitive element of the visual sensor is in accordance with a predetermined pattern; subject to the pixel map corresponding to the predetermined pattern, determining that the visual sensor is capped by the cap, and subject to the pixel map not corresponding to the predetermined pattern, determining that the visual sensor is not capped by the cap; and taking an action, dependent on whether the visual sensor is capped or not capped, in accordance with a setting.

BRIEF DESCRIPTION OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
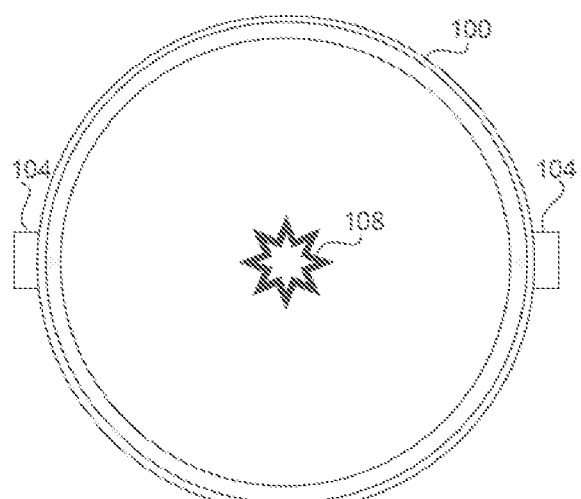
FIG. 1 is a schematic illustration of a first implementation of a cap of a visual sensor, the cap having a first opening, in accordance with some exemplary embodiments of the disclosed subject matter.

Unless specifically stated otherwise, the term "visual sensor" used in the specification should be expansively construed to cover any device designed for nonobstructively obtaining an aspect of the environment and possibly analyzing the captured data and possibly further communicating the captured data and/or the results of said analysis. In particular, the term "visual sensor" covers a visual capture device, such as a camera, a camcorder, or the like. A visual sensor may comprise a lens, a light-sensitive element designed to convert the variable attenuation of light waves as they pass through the lens into an array of digital values (pixels) that record the captured visual information, a memory device, a processor adapted to process and analyze these digital values, and an interface for communicating with other devices or elements. Image sensors may include but are not limited to charge-coupled devices (CCDs), active-pixel sensors (CMOS sensors), near- or far-infrared sensors, PIR (passive IR) sensors and the like.

Visual sensors often come equipped with a lens cover or lens cap designed for protecting the lens from dust, minor collisions, or the like, as well as protecting the light sensitive element from mechanical or radiation damage. In some cases the lens cap is enclosed within the system, as in the camera of a notebook computer that may have two, three or more positions, as detailed for example in U.S. patent application Ser. No. 16/706,875 titled "A Triple-Mode Camera System and Method of Using the Same", assigned to the same assignee as the current application.

One technical problem of the disclosure is that a user, such as a user of a portable computing device, a mobile phone, an action camera user (e.g., a policeman or sport enthusiast), a photographer, or the like, may not notice that the cap is on, until he or she attempts to take an image or a video clip. If the cap is on, by the time the photographer so notices, it may already be too late for taking the specific image or clip.

Another technical problem of the disclosure is that in multiple applications of the visual sensor, it is required to know whether the lens cap is on. Such usages may include but are not limited to protecting the device, saving battery life by shutting down or hibernating the visual sensor if the cap is on, optimizing messages to the user, managing the operation of an auxiliary illumination or the like.

In some applications the visual sensor needs to determine whether the lens cap is on in order to perform advanced applications such as face recognition, gesture recognition, gaze estimation and so on. If the cap is off the device may need to change its internal configuration, for example increase the gain or turn on auxiliary illumination, turn on a processor or invoke a process in a processor, all of which may be futile and consume unnecessary energy if the cap is on. Thus, if the cap is on, either because the user intentionally placed it or because she forgot to take it off, such actions cannot be performed or are performed in vain; a warning or some other interaction with the user may then be required. Thus, knowledge by the sensor whether the lens cap is on or off can be important in many applications and situations.

One technical solution of the disclosure relates to a passive method of determining whether a visual sensor is capped, using a cap that comprises a light transmitting part, thereby enabling recognition of the presence of the cap.

The light-transmitting part may be an aperture, a slit, a geometric configuration of points and lines or any other one or more openings in the cap, through which light can pass and that can be recognized. The opening may be small enough, for example up to 0.5 cm square, 0.1 cm square, 0.01 cm square, 1% of the cap area, 5% of the cap are, or the like, such that it will not significantly harm the cap's ability to protect the lens.

In other embodiments, the light-transmitting part may be a solid non-opaque area of the cap, made for example of partially-transparent material. In these embodiments, the light-transmitting part may be larger than the aperture discussed above, as it does not expose the protected lens to dust, collisions or the like. The partially-transparent material can have a uniform transparency value or can be made in several transparency grades to aid recognition.

In the above embodiments, the light-transmitting part, whether it is an opening or a non-opaque part, may be of a specific shape, such as a cross, a star, a triangle, a barcode, a piece of text, a configuration of points, an amorphic shape, or any recognizable shape. Having such specific shape enables to identify the shape within the "pixel map" output by the pixels of the sensing unit, and thereby deduce whether the cap is on with high certainty. In some embodiment, the partially-transparent material can have a uniform transparency value or can be made of materials or widths having variable transparency grades to aid recognition. In further embodiments, the cap pattern may be designed to form a unique identification pattern or mark, such as a barcode, a QR code, or the like, such that a camera may not recognize the cap if the identification pattern is unexpected, thereby realizing it is a wrong cap. In that case, a specific action may be taken, for example refusing to perform an act such as turning the camera on or off, sending a message to a registered user of the camera or to another entity, or the like. The particular shape can be generic to the entire set of products, or specific for each produced sensor. If the identification pattern is as expected, it may be realized that the appropriate cap is capping the camera.

It will be appreciated that the term "pixel map" may relate to the digital values output by the light sensitive element unit. If the pattern recognizably corresponds to the pixels expected to be affected by the cap, which may be the pixels located near the light transmitting part (e.g., pixels located on normals to the plan of the cap, wherein the normals meets the cap plan at the light-transmitting part), while other pixels have recognizably lower gray level values, it may be deduced that the cap is on. Methods of recognizing such patterns are well known in the art of image processing and pattern recognition, including for cases where the image is blurred to some extent due to the proximity of the cap to the lens.

It will be appreciated that the exact shape of the pattern is immaterial as long as it is recognizable with high certainty by the sensor's image signal processor (ISP).

The pixel map created when the cap is on may be obtained and stored, for example for a series of caps and devices, such that patterns obtained when the visual sensor is used may be compared to the stored patterns.

Figure 2:
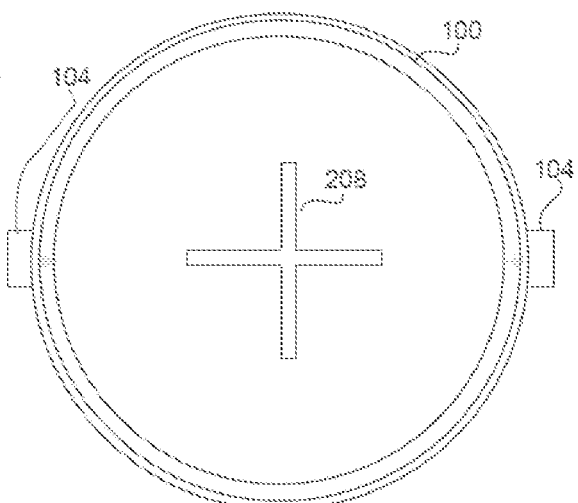
FIG. 2 is a schematic illustration of a second implementation of a cap of a visual sensor, the cap having a second opening, in accordance with some exemplary embodiments of the disclosed subject matter.

Referring now to FIG. 1 and FIG. 2, showing embodiments of caps in accordance with the disclosure. Cap 100 may comprise clasps 104, or another mechanism, for capping and de-capping the visual sensor. Cap 100 may comprise an opening in a particular shape, such as star 108 of FIG. 1, cross 208 of FIG. 2, or the like. As discussed above, the area of the opening should be small enough, so as not to endanger the protected lens while being easily recognizable.

Figure 3:
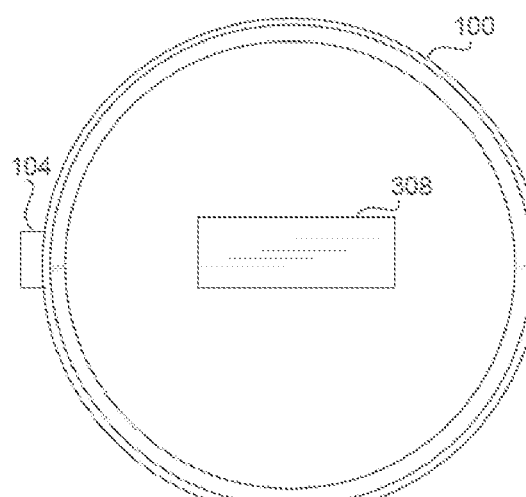
FIG. 3 is a schematic illustration of a cap of a visual sensor, the cap having a nonopaque part, in accordance with some exemplary embodiments of the disclosed subject matter.

Referring now to FIG. 3, showing another embodiment of a cap in accordance with the disclosure. Cap 100 comprises a fully or partly transparent part 308, which transmits at least some of the environmental light to the protected lens. Part 308 is also of a distinguishable shape, such as a rectangle, a star, or the like. Part 308 may be larger than the openings discussed above such as star 108 or cross 208, since it protects the lens as does a traditional cap. However, part 308 cannot be made too large, as it still needs to create a distinguishable pattern on the pixel map. If part 308 is too large, the pixel map may mostly consist of non-background values, which may disable the identification of a specific pattern of the non-background pixels. Thus, the area of part 308 may be at most 25% of the area of the cap, 50% the area of the cap, 75% of the area of the cap, or the like.

It will be appreciated that the passive schemes described above are not limited to a single light-transmitting area nor to a single transparency value of the area. Rather, the cap may comprise multiple such parts with optionally multiple transparency values, wherein the pattern created on the pixel map by the light passing through these parts is recognizable.

In some embodiments, at least a section of the partly transparent part 108, 208 or 308 may be made of a material transparent to a particular wavelength range, such as blue, red, infrared, or the like, while blocking the other wavelengths The sensor may comprise pixels which are sensitive to the particular wavelength range as well as pixels with different sensitivities.

The pixel map of the pixels sensitive to the particular wavelength range and the pixel map of the rest of the pixels may then be compared. If the maps correspond to each other (taking into account the pixels location differences), the light is not coming from the partly transparent part only, meaning that the cap is off. If, however, the maps do not correspond, and optionally the one of them corresponds to a predetermined map, it may be deduced that the cap is on. It will be appreciated that the embodiment of spectrally selective cap and pixels sensitive to a particular wavelength range may be applied in conjunction with other disclosed embodiments. Algorithms for recognizing the active or passive lens cap pattern may include template recognition algorithms, edge or point detectors, texture analysis algorithms, neural networks, convolutional neural networks or any other suitable approach known in the art of image processing.

It will be appreciated that with the passive schemes described above, it may not be possible to differentiate between the cap being on and off in situations of near absolute darkness, for example when the visual sensor is inside a closed opaque bag. However, the passive schemes are easy and inexpensive to make and use, and do not require significant amount of power or other resources. Moreover, the information they produce, i.e., a situation which is either a) cap is off; b) cap is on and there is significant ambient light outside c) cap state is unknown, and there is very low ambient light outside, is of high importance to the sensor.

Another technical solution relates to active schemes for determining whether a visual sensor is capped or not. The active schemes comprise the recognition of radiation by a radiating element as captured by the sensing unit, wherein energy from the radiating element is received by the sensing unit only when the cap is on. The pattern created on the sensing unit may them be compared to the pattern expected when the cap is on.

One embodiment relates to placing an optically radiant element on the inner side of the cap, such as small Light Emitting Diode (LED) or phosphorescent material, such that the light energy is received by the sensing unit. In other embodiments, a thermal radiant element such an IR emitting LED, may be placed on the cap inner side, which may create infrared reading on the sensing unit. Such elements can be very weak photon emitters, since they are close to the sensor element.

Figure 4:
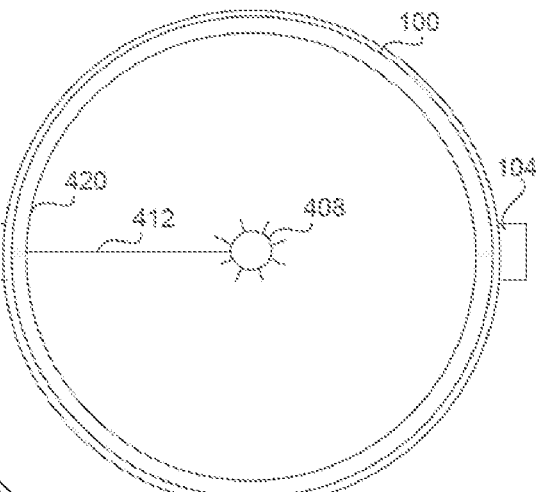
FIG. 4 is a schematic illustration of a cap of a visual sensor, the cap having a radiant element, in accordance with some exemplary embodiments of the disclosed subject matter.

FIG. 4 shows the inner side of cap 100 with a radiant element 408, which may be an optical radiant element, a thermal radiant element, or the like.

Radiant element 408 may comprise an autonomous power source, or may receive power through wiring 416 which connects through cap ring 420 to the lens, and obtains energy from the lens or from another component of the apparatus, such that capping the visual sensor, closes a circuit and radiant element 408 is turned. Thus, radiant element 408 may receive energy and radiate only when the visual sensor is capped.

In yet another embodiment, the visual sensor may comprise an optical radiant element placed close to the sensing unit, and the cap may comprise a reflecting part, which reflects the light from the optical radiant element back to the light sensitive element of the visual sensor.

Figure 5:
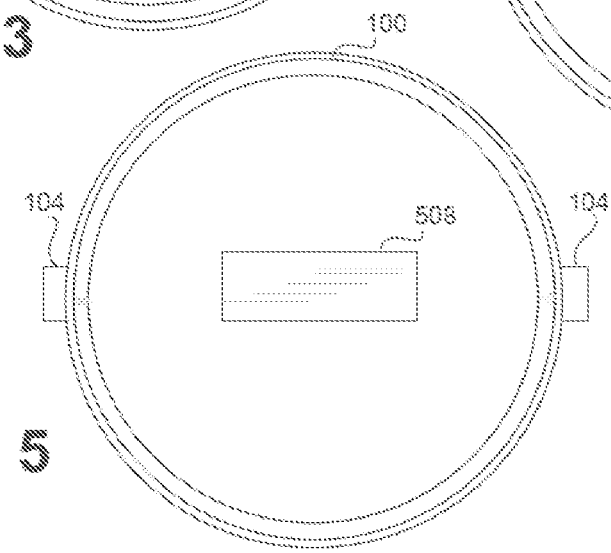
FIG. 5 is a schematic illustration of a cap of a visual sensor, the cap having a reflector, in accordance with some exemplary embodiments of the disclosed subject matter.

Referring now to FIG. 5, showing the inner side of cap 100 comprising a reflecting part 508, which reflects the light received from the radiant element onto the sensing unit. It will be appreciated that reflecting part 508 may or may not be parallel to the sensing unit, such that it reflects the light received from the radiant element which is near the lens onto some part of the sensing unit.

In the active scheme embodiments, the pixel map may indicate that the cap is on if the image shows mainly the pixels onto which reflector 508 reflects the light, as may be determined during design, manufacturing or post-manufacturing of the visual sensor and the cap. For the recognition step, the image of the active element may be defocused because of its adjacency to the sensing element, and this may be accounted for in the recognition algorithm.

The embodiment of FIG. 5 has the advantage that the cap does not need to contain a power source or wiring for receiving power, rather the radiating element is located on the body of the visual sensor, where power is more easily available.

In some embodiments, a scheme analogous to the scheme described above for the partly transparent section comprising a section transparent only to a particular wavelength range may be employed. For example, the optically radiant element can comprise a part that radiates in a particular wavelength range, and the sensor may comprise pixels specifically sensitive to this range. If the pixel map generated by the pixels sensitive to the particular wavelength range corresponds to the pixel map generated by the other pixels, it may be deduced that the cap is off, and vice versa.

The active schemes described above may be more complex and expensive to produce and implement than the passive schemes, and may consume some energy. However, unlike the passive schemes, the active schemes can positively indicate whether the cap is on or off in all situations, including complete ambient darkness.

Figure 6:
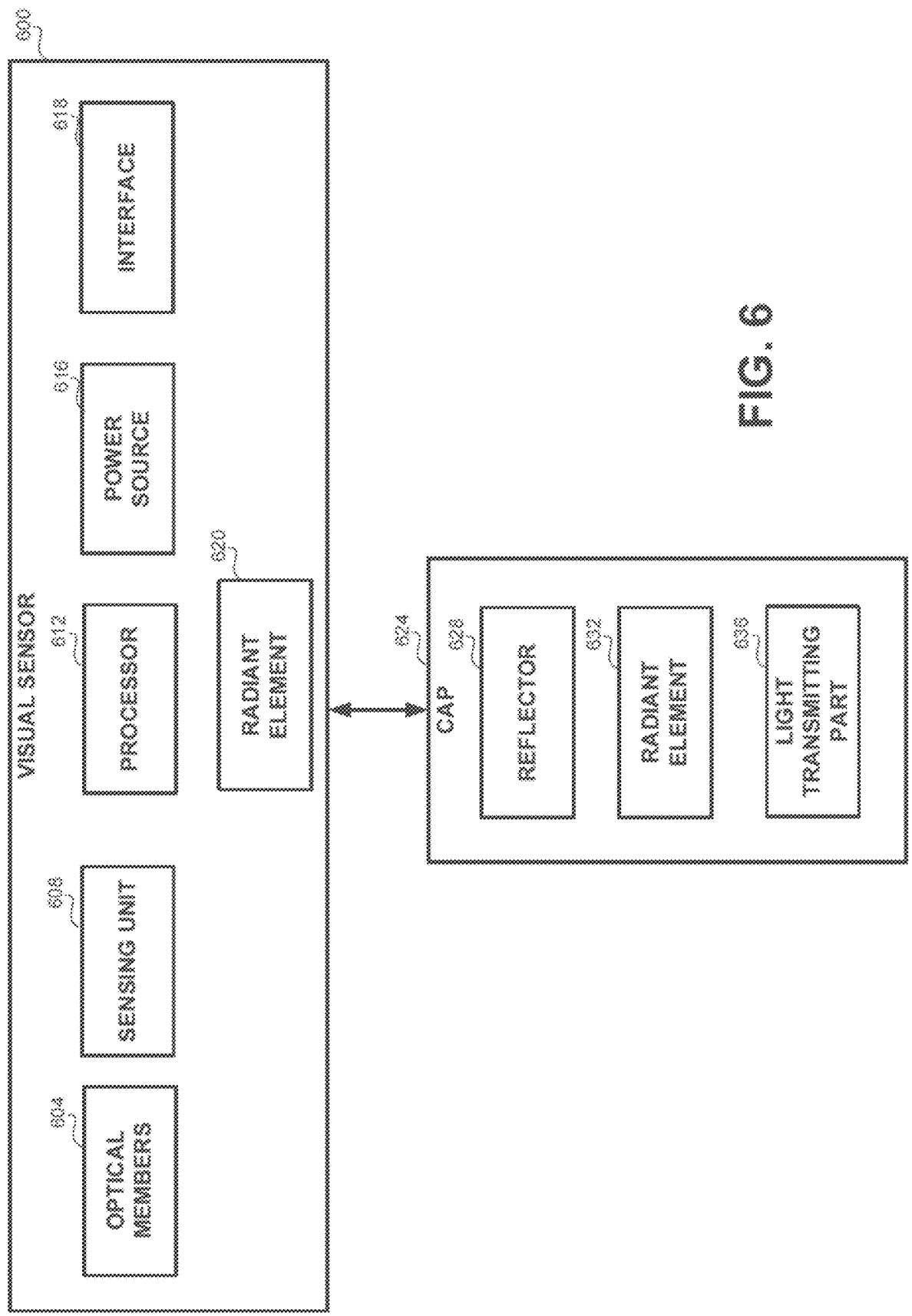
FIG. 6 is a schematic block diagram of a visual sensor and a cap, in accordance with some exemplary embodiments of the disclosed subject matter.

Referring now to FIG. 6, showing a schematic block diagram of a Visual sensor and cap, in accordance with some embodiments of the disclosure.

Visual sensor 600 may comprise one or more optical elements 604, such as lenses, mirrors, filters, focus mechanisms or the like, for focusing and receiving light from the environment, and transmitting the light to a sensing unit.

Visual sensor 600 may comprise sensing unit 608, such as a CCD sensor, a CMOS sensor, an IR sensor or the like, for receiving light transmitted through optical members 604, and outputting a pixel map, indicative of the captured image.

Visual sensor 600 may comprise processor 612 for processing the pixel map output by sensing unit 608, as is often performed by a specific Image Signal Processor (ISP). In some embodiments, processor 612 may also be operative to determine whether the visual sensor cap is on or off, and issue a corresponding alert or instruction if required.

Visual sensor 600 may comprise one or more power sources 616 for providing power to sensing unit 608 and to processor 612. In other embodiments, visual sensor 600 may receive power from an external source.

Visual sensor 600 may also comprise an interface for obtaining parameters and instructions and for providing the capturing and/or analysis results to another element, system or the like.

It will be appreciated that Visual sensor 600 may comprise additional mechanical, electronical, or other components, such as a shutter, controllers, storage devices, interfaces, electronic circuits and others, as is known in the field of visual sensors.

In some embodiments, where the passive scheme described above is implemented, visual sensor 600 may comprise a radiant element 620, such as an optical radiant element.

Cap 624 may comprise any of the parts or members disclosed above. For example, cap 624 may comprise a reflector 628, illustrated as reflector 508 of FIG. 5, for reflecting light by radiant element 620, if comprised in visual sensor 600.

In further embodiments, cap 624 may comprise a radiant element 632, such as optical radiant element 408 of FIG. 4. In such embodiments, cap 624 may also comprise a connector for providing power to radiant element 632.

In yet further embodiments, cap 624 may comprise a light transmitting part 636 useful in the passive schemes disclosed above. Light transmitting part 636 may be an opening in cap 624, such as openings 108 of FIG. 1 or 208 of FIG. 2, or a partly-transparent opening smaller than the cap such as opening 308 of FIG. 3.

Figure 7:
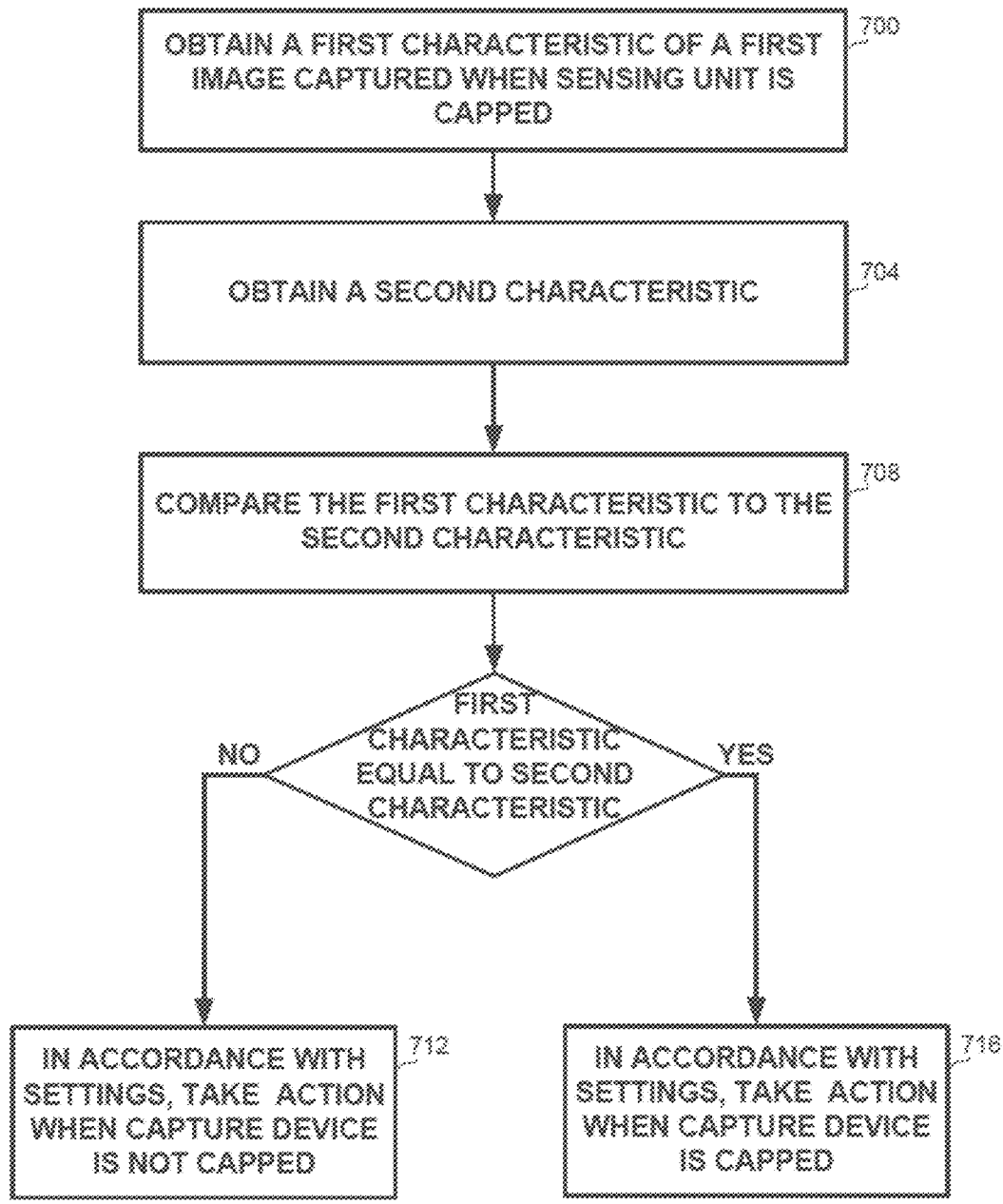
FIG. 7 is a flowchart of steps in an embodiment of a method for identifying whether a visual sensor is capped, in accordance with some exemplary embodiments of the disclosed subject matter.

Referring now to FIG. 7, showing a flowchart of an embodiment of a method for determining whether a visual sensor has its cap on or not.

The method of FIG. 7 may be executed by a processor, for example processor 612 of FIG. 6, or another processor.

On step 700, a first characteristic of a first image captured when a visual sensor is capped may be obtained. The first characteristic may be a pixel map, a binary pixel map in which all non-background pixels are assigned a predetermined value, a hash value of the pixel map, statistics of analysis of multiple images captured with the cap on or the like. The first characteristic may be created in design time of the visual sensor and the cap, during manufacturing, or post-manufacturing. The first characteristic may be stored in a storage device of visual sensor. Algorithms for recognizing the active or passive lens cap pattern include template recognition algorithms, edge or point detectors, texture analysis algorithms, neural networks, convolutional neural networks or any other suitable approach known in the art of image processing.

On step 704, a second characteristic may be obtained, for example when the visual sensor is in use. The second characteristic may be of the same type as the first characteristic, for example also a pixel map, a binary pixel map, or the like.

On step 708, the first characteristic and the second characteristic may be compared. For example, if the first characteristic and the second characteristic are pixel maps or binary pixel maps, the locations of the non-background values may be compared. The comparison result may be a binary number, e.g., 0 for different and 1 for the same. However, the term "equal" may relate to "substantially equal" wherein equality may not relate to absolute mathematical equality, but also to a certainty degree of the comparison result exceeding a threshold. For example, if the characteristic is a binary pixel map, and at least a predetermined number such as 90% of the non-background pixels of the first characteristic are also non-background in the second one, and vice versa (possibly with a different predetermined number), it may be determined that the characteristics are substantially equal, and the cap is on. If, on the other hand, at least another predetermined number of zero pixels in the first characteristic (for example over 30% of the pixels) are higher than zero in the second one, it may be determined that the cap is off. The characteristic and/or the threshold may be determined as part of calibrating the visual sensor during design, manufacturing or post-manufacturing the visual sensor. It will be appreciated that the considerations above are exemplary only, and other considerations and algorithms may be used as known in the art of image processing. For example, a neural network may be trained to distinguished between "cap on" and "cap off" states. Additionally or alternatively, approaches such as texture analysis, template recognition and numerous other approaches may be applied for the distinction between "cap on" and "cap off" states.

If the first characteristic and the second characteristic are concluded to be different, then it may be deduced that the cap is off, and on step 712, according to settings of the visual sensor, an action may be taken. For example, the action may be an alert issued to a user that the visual sensor is not capped. For example, such alert may be issued if the visual sensor is off, if it is sensed that the visual sensor is in a dark place, or another indication that the user is not about to take an image. The alert may be issued by playing a sound, turning on a light source such as a LED, or the like. In another example, the action may be turning on the visual sensor.

If the first characteristic and the second characteristic are determined to correspond, then it may be deduced that the cap is on, and on step 716, according to settings of the visual sensor, an action may be taken. For example, the action may be an alert issued to a user that the visual sensor is capped. For example, such alert may be issued if the visual sensor is on, if it is sensed that a user is holding the visual sensor, or another indication that the user is about to take an image. The alert may be issued by playing a sound, turning on a light source such as a LED, or the like. In some embodiments, the visual sensor may be turned off.

In further embodiments, a mechanical solution may be provided for determining whether the capture device is capped or not, in which a switch is provided on the body of the capture which is pressed by the cap when the cap is on, and released when the cap is off, or vice versa, thereby providing a definite indication to whether the cap is on or off. A corresponding alert may then be issued as described in association with steps 712 and 716 above.

Figure 8:
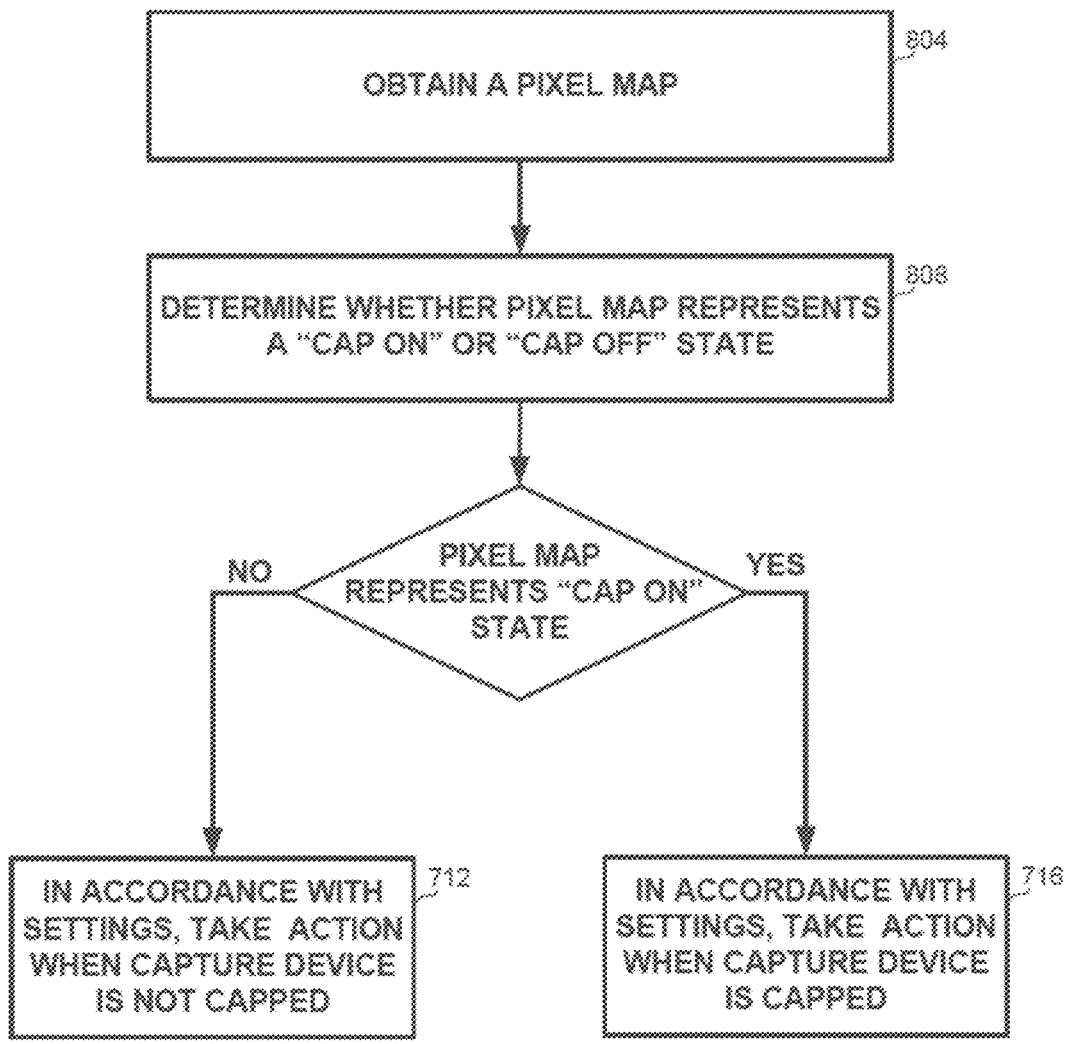
FIG. 8 is a flowchart of steps in another embodiment of a method for identifying whether a visual sensor is capped, in accordance with some exemplary embodiments of the disclosed subject matter.

Referring now to FIG. 8, showing a flowchart of another embodiment of a method for determining whether a visual sensor has its cap on or not.

The method of FIG. 8 may also be executed by a processor, for example processor 612 of FIG. 6, or another processor.

On step 804, a pixel map may be obtained from a light sensitive element, the pixel map indicative of the light received by the element, which depends also on whether the cap is on or off.

On step 808, it may be determined whether the pixel map represents a "Cap On" or a "Cap Off" state The determination may be performed by per-pixel comparison to a graphically designed binary template stored in memory, by hard coded comparison, by a comparison to parameters received in runtime, by operating a trained machine-learning algorithm, texture analysis, template recognition methods or in any other manner. It will be appreciated that the determination may be made by invoking computer code previously developed for this purpose, for example during design or manufacturing of the visual sensor.

If the pixel map represents a "Cap Off" state, execution may continue on step 712 as described above, and if the pixel map corresponds to the "Cap On", execution may continue on step 716 as described above.

One technical effect of the disclosure comprises automatic detection of whether a cap of a visual sensor is on or off. This differentiation may be useful in avoiding situations in which the cap is on but should be off, for example when the user is about to take an image, or vice versa, for example when the visual sensor is off and the lens should be protected.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A nonexhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, cloud storage, volatile memory, non-volatile memory, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as Python, MATLAB, the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A visual sensor adapted to be capped with a cap including at least one light-transmitting part comprising an opening, in the cap, the visual sensor comprising:
   a light sensitive element for outputting a pixel map; and
   a processor for:
   determining whether the pixel map is the accordance with a predetermined pattern by obtaining a first characteristic of a preliminary pixel map, obtaining a second characteristic of the pixel map output by the light sensitive element, and comparing the first characteristic to the second characteristic;
   subject to the pixel map corresponding to the predetermined pattern, determining that the visual sensor is capped by the cap, and
   subject to the pixel map not corresponding to the predetermined pattern, determining that the visual sensor is not capped by the cap, and
   taking an action, dependent on whether the visual sensor is capped or not capped, in accordance with a setting.

2. The visual sensor of claim 1, wherein an area of the opening is less than 20% of an area of the cap.

3. The visual sensor of claim 1, wherein the at least one light-transmitting part has an area smaller than an area of the cap.

4. The visual sensor of claim 1, wherein the at least one light-transmitting part has an area smaller than half an area of the cap.

5. The visual sensor of claim 1 wherein the at least one light-transmitting part comprises at least two distinct areas having different transparency values.

6. The visual sensor of claim 1, wherein the action comprises issuing an alert to a user of the visual sensor.

7. A visual sensor adapted to be capped with a cap including at least one light-transmitting part comprising a section transparent only to a specific wavelength range, the visual sensor comprising:
   a light sensitive element comprising pixels sensitive only to the specific wavelength range and pixels sensitive to a different wavelength range, the light sensitive element outputting a first pixel map from the pixels sensitive only to the specific wavelength range and a second pixel map from the pixels sensitive to the different wavelength range; and
   a processor for:
   subject to the first pixel map corresponding to the second pixel map, determining that the visual sensor is not capped by the cap,
   subject to the pixel map corresponding to the predetermined pattern, determining that the visual sensor is capped by the cap, and
   taking an action, dependent on whether the visual sensor is capped or not capped, in accordance with a setting.

8. A visual sensor adapted to be capped with a cap comprising a radiating element located on a side of the cap facing a lens of the visual sensor when the sensing unit is capped, the visual sensor comprising:
   a light sensitive element for outputting a pixel map; and
   a processor for;
   determining whether the pixel map is in accordance with a predetermined pattern by obtaining a first characteristic of a preliminary pixel map, obtaining a second characteristic of the pixel map output by the light sensitive element, and comparing the first characteristic to the second characteristic,
   subject to the pixel map corresponding to the predetermined pattern, determining that the visual sensor is capped by the cap,
   subject to the pixel map not corresponding to the predetermined pattern, determining that the visual sensor is not capped by the cap, and
   taking an action, dependent on whether the cap is on or off, in accordance with a setting.

9. The visual sensor of claim 8, wherein the radiating element is an optical radiant element.

10. The visual sensor of claim 9 wherein the radiating element is a Light Emitting Diode (LED) or phosphorescent material.

11. The visual sensor of claim 8, wherein the radiating element is an infrared radiant element.

12. The visual sensor of claim 8, further comprising a power source for providing power to the radiating element.

13. The visual sensor of claim 8, further comprising wiring for providing power to the radiating element from the visual sensor when the cap is on.

14. The visual sensor of claim 8, wherein the action comprises issuing an alert to a user of the visual sensor.

15. A visual sensor adapted to be capped with a cap comprising a radiating element configured to radiate in a specific wavelength range, the radiating element located on a side of the cap facing a lens of the visual sensor when the sensing unit is capped, the visual sensor comprising:
   a light sensitive element comprising pixels sensitive only to the specific wavelength range and pixels sensitive to a different wavelength range, the light sensitive element outputting a first pixel map from the pixels sensitive only to the specific wavelength range and a second pixel map from the pixels sensitive to the different wavelength range; and
   a processor for:
   subject to the first pixel map corresponding to the second pixel map, determining that the visual sensor is not capped by the cap,
   subject to the first pixel map not corresponding to the second pixel map, determining that the visual sensor is capped by the cap, and
   taking an action, dependent on whether the visual sensor is capped or not capped, in accordance with a setting.

16. A visual sensor adapted to be capped with a cap comprising a reflector located on a side of the cap facing a lens of a visual sensor when the cap is on, the visual sensor comprising:
- a radiating element configured to radiate in a predetermined wavelength range;
- a light sensitive element comprising pixels sensitive only to the specific wavelength range and pixels sensitive to a different wavelength range, the light sensitive element outputting a first pixel map from the pixels sensitive only to the specific wavelength range and a second pixel map from the pixels sensitive to the different wavelength range; and
- a processor for:
    - subject to the first pixel map corresponding to the second pixel map, determining that the visual sensor is not capped by the cap,
    - subject to the first pixel map not corresponding to the second pixel map, determining that the visual sensor is capped by the cap, and
    - taking an action, dependent on whether the visual sensor is capped or not capped, in accordance with a setting.

* * * * *

UNITED STATES PATENT AND TRADEMARK OFFICE
CERTIFICATE OF CORRECTION

PATENT NO. : 11,892,747 B2  
APPLICATION NO. : 17/878979  
DATED : February 6, 2024  
INVENTOR(S) : Tomer Kimhi Page 1 of 1

It is certified that error appears in the above-identified patent and that said Letters Patent is hereby corrected as shown below:

In the Claims

In Column 13, Line 29, Claim 1, delete "determining whether the pixel map is the accordance with" and insert -- determining whether the pixel map is in accordance with --

Signed and Sealed this
Twenty-seventh Day of August, 2024

Katherine Kelly Vidal
*Director of the United States Patent and Trademark Office*